US012095148B2

(12) United States Patent
Wang et al.

(10) Patent No.: US 12,095,148 B2
(45) Date of Patent: Sep. 17, 2024

(54) WATER SEAL DESIGN WITH ANTENNA CO-EXISTENCE ON ELECTRONIC DEVICE

(71) Applicant: Google LLC, Mountain View, CA (US)

(72) Inventors: Zheyu Wang, San Jose, CA (US); Joshua Randall Clyne, Santa Clara, CA (US); Paul Biggins, Mountain View, CA (US); John Lapetina, San Francisco, CA (US); Jiang Zhu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 348 days.

(21) Appl. No.: 17/768,129

(22) PCT Filed: Sep. 22, 2020

(86) PCT No.: PCT/US2020/051981
§ 371 (c)(1),
(2) Date: Apr. 11, 2022

(87) PCT Pub. No.: WO2021/071667
PCT Pub. Date: Apr. 15, 2021

(65) Prior Publication Data

US 2023/0142400 A1 May 11, 2023

Related U.S. Application Data

(60) Provisional application No. 62/913,206, filed on Oct. 10, 2019.

(51) Int. Cl.
*H05K 7/02* (2006.01)
*G04G 17/08* (2006.01)
(Continued)

(52) U.S. Cl.
CPC ............. *H01Q 1/241* (2013.01); *G04G 17/08* (2013.01); *H01Q 21/28* (2013.01)

(58) Field of Classification Search
None
See application file for complete search history.

(56) References Cited

U.S. PATENT DOCUMENTS 7,639,569 B2 * 12/2009 Yano ...................... G04R 60/12 368/88
9,030,817 B2 * 5/2015 Dabov .................. H05K 13/00 361/679.01

(Continued)

FOREIGN PATENT DOCUMENTS

CH 703918 A2 4/2012
EP 0844685 A1 5/1998

(Continued)

OTHER PUBLICATIONS

Office Action for Korean Patent Application No. 10-2022-7011806 dated Aug. 10, 2023. 4 pages.

(Continued)

*Primary Examiner* — Tuan A Tran
(74) *Attorney, Agent, or Firm* — Lerner David LLP

(57) ABSTRACT

The technology provides for an electronic device. The electronic device includes a housing, a display cover, and a modular component configured to provide a seal between the housing to the display cover. The modular component is configured to be attached to the housing. Further, the modular component includes a first surface configured to be attached to the display cover. The modular component includes a channel extending along the first surface, where the channel is configured to hold a liquid adhesive that bonds with the display cover. The modular component further includes a radial protrusion disposed on the first surface, the radial protrusion is configured to be in contact with the display cover when the display cover is attached to the housing and to prevent the liquid adhesive from moving out of the channel.

20 Claims, 9 Drawing Sheets

(51) Int. Cl.

| | |
|---|---|
| ***G04G 21/04*** | (2013.01) |
| ***G06F 1/16*** | (2006.01) |
| ***H01Q 1/24*** | (2006.01) |
| ***H01Q 21/28*** | (2006.01) |

(56) References Cited

U.S. PATENT DOCUMENTS

| | | | | |
|---|---|---|---|---|
| 9,098,242 | B2 * | 8/2015 | Rappoport | G06F 1/1656 |
| 9,186,828 | B2 | 11/2015 | Guterman et al. | |
| 9,310,845 | B2 * | 4/2016 | Dabov | H04R 31/00 |
| 9,447,880 | B2 * | 9/2016 | Holcomb | F16J 15/02 |
| 9,612,582 | B1 | 4/2017 | Wang et al. | |
| 9,674,922 | B2 * | 6/2017 | Malon | G06F 1/1637 |
| 9,814,151 | B2 * | 11/2017 | Probst | H04B 1/3888 |
| 10,021,226 | B2 * | 7/2018 | Gagne-Keats | C09J 131/04 |
| 10,088,863 | B2 * | 10/2018 | Rappoport | G06F 1/1637 |
| 10,228,719 | B2 * | 3/2019 | Rappoport | G06F 1/1637 |
| 10,386,790 | B2 * | 8/2019 | Katsuda | G04B 37/08 |
| 10,739,465 | B2 * | 8/2020 | Katsuda | G01S 19/42 |
| 10,860,054 | B2 * | 12/2020 | Rappoport | G06F 1/1656 |
| 2017/0251086 | A1 * | 8/2017 | Gagne-Keats | B22F 5/00 |
| 2018/0181079 | A1 * | 6/2018 | Katsuda | G04B 37/08 |
| 2019/0094419 | A1 * | 3/2019 | Nagahara | G02B 5/208 |
| 2019/0123429 | A1 | 4/2019 | Ramaci | |
| 2020/0292865 | A1 * | 9/2020 | Wang | G06F 3/041 |

FOREIGN PATENT DOCUMENTS

| | | | |
|---|---|---|---|
| EP | 2228695 | A1 | 9/2010 |
| JP | S5789975 | U | 6/1982 |
| JP | S62069187 | U | 4/1987 |
| JP | H01259290 | A | 10/1989 |
| JP | 2009296296 | A | 12/2009 |
| JP | 2018063150 | A | 4/2018 |
| JP | 2018100927 | A | 6/2018 |
| JP | 2018105666 | A | 7/2018 |
| JP | 2019128270 | A | 8/2019 |

OTHER PUBLICATIONS

Tag Heuer. "Tag Heuer Connected Modular." Retrieved on Jul. 10, 2019. 11 pages. Retrieved from the Internet: <https://www.tagheuer.com/en-us/watches/tag-heuer-connected>.

Bohn, Dieter. "Tag Heuer and Intel are making another $1,600 Android Wear smartwatch." The Verge. Mar. 14, 2017. Retrieved on Jul. 10, 2019. 4 pages. Retrieved from the Internet: <https://www.theverge.com/2017/3/14/14909646/tag-heuer-connected-modular-45-android-wear-1600-smartwatch>.

AFP Relaxnews. "TAG Heuer unveils the Connected Modular 41 in Geneva." Tech News. The Star Online. Jan. 17, 2018. 2 pages. Retrieved on Jul. 10, 2019. Retrieved from the Internet: <https://www.thestar.com.my/tech/tech-news/2018/01/17/tag-heuer-unveils-the-connected-modular-41-in-geneva/>.

International Search Report and Written Opinion for International Application No. PCT/US2020/051981 dated Nov. 30, 2020. 14 pages.

Notice of Grant for Japanese Patent Application No. 2022-521498 dated Aug. 29, 2023. 3 pages.

International Preliminary Report on Patentability for International Application No. PCT/US2020/051981 dated Apr. 21, 2022. 8 pages.

* cited by examiner

600

WATER SEAL DESIGN WITH ANTENNA CO-EXISTENCE ON ELECTRONIC DEVICE

CROSS-REFERENCE TO RELATED APPLICATIONS

The present application is a national phase entry under 35 U.S.C. § 371 of International Application No. PCT/US2020/051981, filed Sep. 22, 2020, published in English, which claims the benefit of U.S. application Ser. No. 62/913,206, filed Oct. 10, 2019, entitled Water Seal Design With Antenna Co-Existence On Electronic Device, the disclosures of which are hereby incorporated herein by reference.

BACKGROUND

For better portability and durability, housings for electronic devices, such as portable electronic devices and wearable devices, may be designed with water resistance. For example, liquid adhesives may be used to seal a housing. However, where components of a small form-factor device are disposed within a limited space inside the housing, overflowing liquid adhesives may contaminate the components inside and affect functions of the device. Alternatively, pressure seals, such as a pressure-sensitive tape or a ring seal, may be used to seal a housing, which do not contaminate components inside the housing. However, such pressure seals may not provide adequate sealing for complex shapes, such as a three-dimensional display cover with a curvature.

Electronic devices include one or more antennas for transmitting and receiving signals in various communication bands. Antenna design for small electronic devices can be challenging because of the constrained form factors of such devices. For example, while a smart phone may have limited space for housing its antennas, a smartwatch with a compact form factor may have even less space. The limited space may restrict various dimensions that impact antenna performance, such as dimensions of an antenna's radiating element, ground plane, and clearance distances to the ground plane and to other antennas. Further, antenna performance for wearable devices may be severely impacted by body effects due to the close proximity to the wearer, which may cause detuning, attenuation, and shadowing of the antenna.

SUMMARY

The present disclosure provides for an electronic device comprising a housing, a display cover, and a modular component configured to be attached to the housing and to provide a seal between the housing and the display cover. The modular component include a first surface configured to be attached to the display cover; a channel extending along the first surface, the channel configured to hold a liquid adhesive that bonds with the display cover; and a radial protrusion disposed on the first surface, the radial protrusion configured to be in contact with the display cover when the display cover is attached to the housing and to prevent the liquid adhesive from moving out of the channel.

The modular component may further include one or more antennas. The one or more antennas may be disposed on the first surface, and the radial protrusion may be disposed between the one or more antennas and the channel such that the radial protrusion prevents the liquid adhesive from moving to the one or more antennas. The radial protrusion may be configured to provide a predetermined clearance distance between the one or more antennas and the display cover. The modular component may be configured to provide a predetermined clearance distance between the one or more antennas and the housing.

The display cover may have a three-dimensional shape with one or more curved portions, wherein the channel may be positioned such that the liquid adhesive bonds with the one or more curved portions of the display cover, and wherein the radial protrusion may be configured to be in contact with the one or more curved portions of the display cover. The display cover may have one or more viewing regions with a display underneath and one or more peripheral regions configured to be attached to the housing, wherein the channel may be positioned so that the liquid adhesive bonds with the one or more peripheral regions, and wherein the radial protrusion may be configured to be in contact with the one or more peripheral regions such that the radial protrusion prevents the liquid adhesive from moving to the one or more viewing regions. The radial protrusion may be configured to have dimensions matching at least a portion of an inside surface of the display cover.

The modular component may have an arcuate shape configured to fit along a portion of an edge of the housing. The modular component may have a ring shape configured to fit along an entire edge of the housing.

An edge of the housing configured to be in contact with the display cover may include an indent providing additional space for holding the liquid adhesive.

The housing may be made of a conductive material, and the display cover is made of a dielectric material.

The present disclosure further provides for a modular component for sealing a display cover to a housing of an electronic device, the modular component configured to be attached to the housing. The modular component comprising a first surface configured to be attached to the display cover; a channel extending along the first surface, the channel configured to hold a liquid adhesive that bonds with the display cover; and a radial protrusion disposed on the first surface, the radial protrusion configured to be in contact with the display cover when the display cover is attached to the housing and to prevent the liquid adhesive from moving out of the channel.

The modular component may further comprise one or more antennas. The one or more antennas may be disposed on the first surface, and the radial protrusion may be disposed between the one or more antennas and the channel.

The modular component may have an arcuate shape configured to fit along a portion of an edge of the housing. The modular component may have a ring shape configured to fit along an entire edge of the housing.

The present disclosure still further provides for an antenna carrier for an electronic device. The antenna carrier comprises a first surface, the first surface having a first area configured to be attached to an inside surface of a housing of the electronic device; a channel extending along the first surface in the first area, the channel configured to hold a liquid adhesive that bonds with the inside surface of the housing; one or more antennas disposed in a second area on the first surface; and a radial protrusion disposed on the first surface in the first area between the channel and the one or more antennas, the radial protrusion configured to be in contact with the inside surface of the housing to prevent the liquid adhesive from moving out of the channel to the one or more antennas.

The one or more antennas may be disposed on the first surface by LDS. The one or more antennas may include a plurality of antennas configured to operate in different frequency ranges.

DETAILED DESCRIPTION

Overview

Figure 1A:
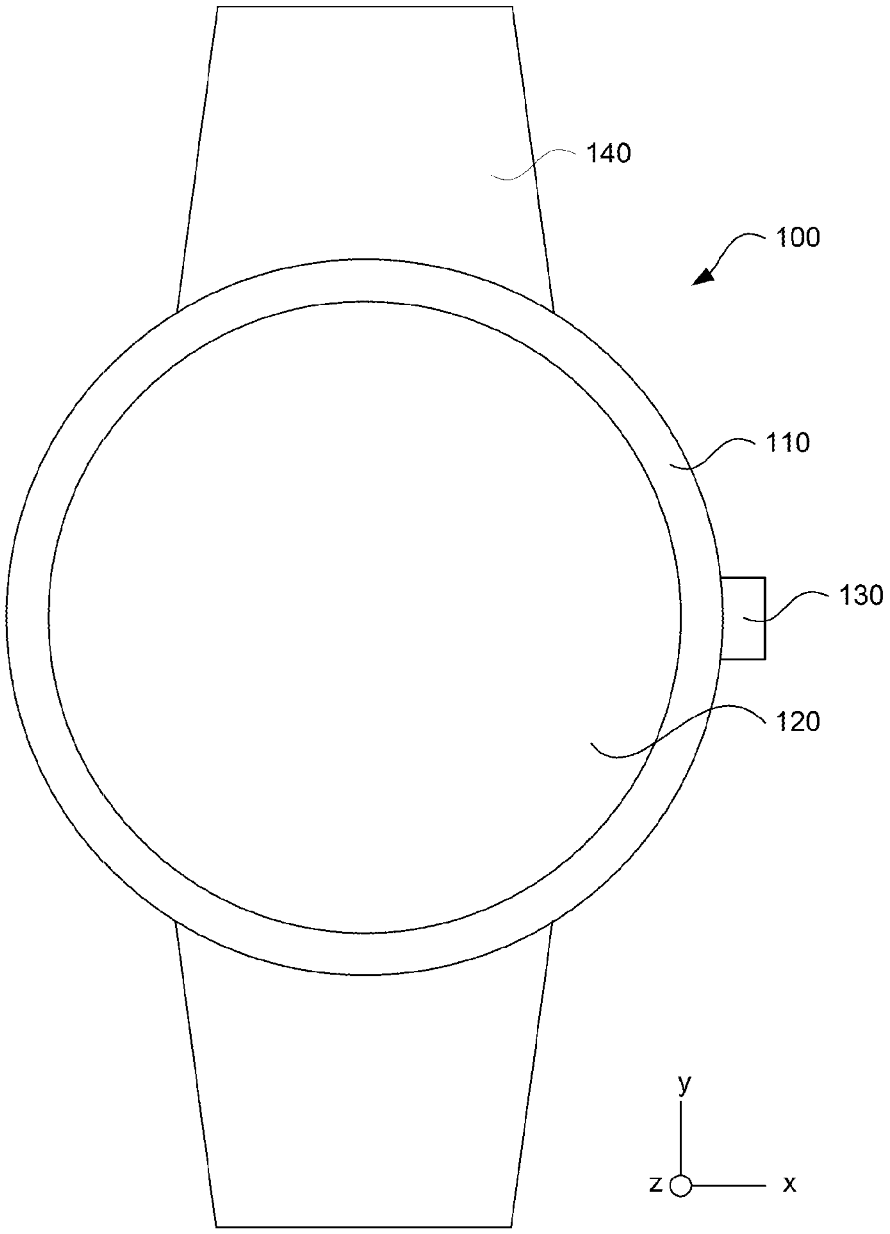
FIGS. 1A and 1B illustrate an example device in accordance with aspects of the disclosure.

The present disclosure generally relates to a modular component for sealing an electronic device. An electronic device, such as a wearable device, may include a housing and a display cover. The electronic device may further include a modular component configured to provide a seal between the display cover and the housing. For instance, the modular component may be configured to be attached to the housing, such as to an edge of the housing. Further, the modular component may have a first surface configured to be attached to the display cover. The modular component may have any of a number of shapes configured to fit along an edge of the housing, such as an arcuate shape or a ring shape, and may be made of any of a number of materials, such as a non-conductive material for antenna integration.

To provide a water-resistant seal, the modular component may include a channel where a liquid adhesive may be applied. The channel may extend along the first surface of the modular component that is configured to be attached to the display cover. Dimensions of the channel may be selected based on a number of factors. For example, dimensions of the channel may be selected based on a diameter of a needle used to inject the liquid adhesive. As another example, dimensions of the channel may be selected based on a predetermined threshold volume of liquid adhesive required for a particular level of water-resistance.

To prevent leaking or expansion of the liquid adhesive to other areas of the electronic device, the modular component may further include a radial protrusion. The radial protrusion may be configured to be in contact with a peripheral region of the display cover when the display cover is attached to the housing. As such, the radial protrusion may prevent the liquid adhesive from moving out of the channel, such as flowing onto a viewing region of the display cover or onto other components inside the housing. Further, the radial protrusion may be configured to provide guidance for precise positioning of the display cover on the housing. For example, dimensions of the radial protrusion, including curvature, may be selected such that the radial protrusion fits along an inside surface of the display cover.

The modular component may further include one or more antennas. For example, the one or more antennas may be disposed on the first surface of the modular component such that the radial protrusion is positioned between the one or more antennas and the channel. As such, the radial protrusion may prevent the liquid adhesive from overflowing to contaminate the antennas. The modular component may be further configured to provide threshold clearance distances between the one or more antennas and the housing, and/or between the one or more antennas and the display cover. For example, dimensions of the modular component and the radial protrusion may be adjusted to provide the clearance distances. The clearance distances may be selected based on desired antenna performances, and based on the materials of the housing and display cover.

In some examples, the display cover may have a three dimensional shape, such as having one or more curved portions instead of being a planar sheet of glass. The channel may be extending along the first surface of the modular component in an area that is configured to be attached to the curved portions of the display cover. As such, the liquid adhesive in the channel may bond with the one or more curved portions of the display cover. The radial protrusion may also be configured to be in contact with the one or more curved portions of the display cover, for example by having matching curvatures.

The modular component as described herein provides increased water resistance for an electronic device, such as a water resistance of up to 50 meters (equivalent to 5 bars or 5 atmospheres) or more. Structural features of the modular component allow liquid adhesives to be applied, which provide better adhesion with complex three dimensional structures. The structural features protect components in the electronic device by preventing overflow of the liquid adhesives, and also provide guidance for precise positioning of components relative to each other. Antenna integration in the modular component saves space in a small factor device and provides flexibility for both antenna design and device design. For example, adjustments can be made to the modular component to change characteristics of the antenna, instead of compromising dimensions and/or materials of the housing or the display cover. Features of the modular component further provide for reduced effects on the antenna from metallic and dielectric materials in the device, such as the housing and the display cover, greater isolation from the body effects of the user, and reduced exposure of a user's body to RF radiation.

Example Systems

Figure 1B:
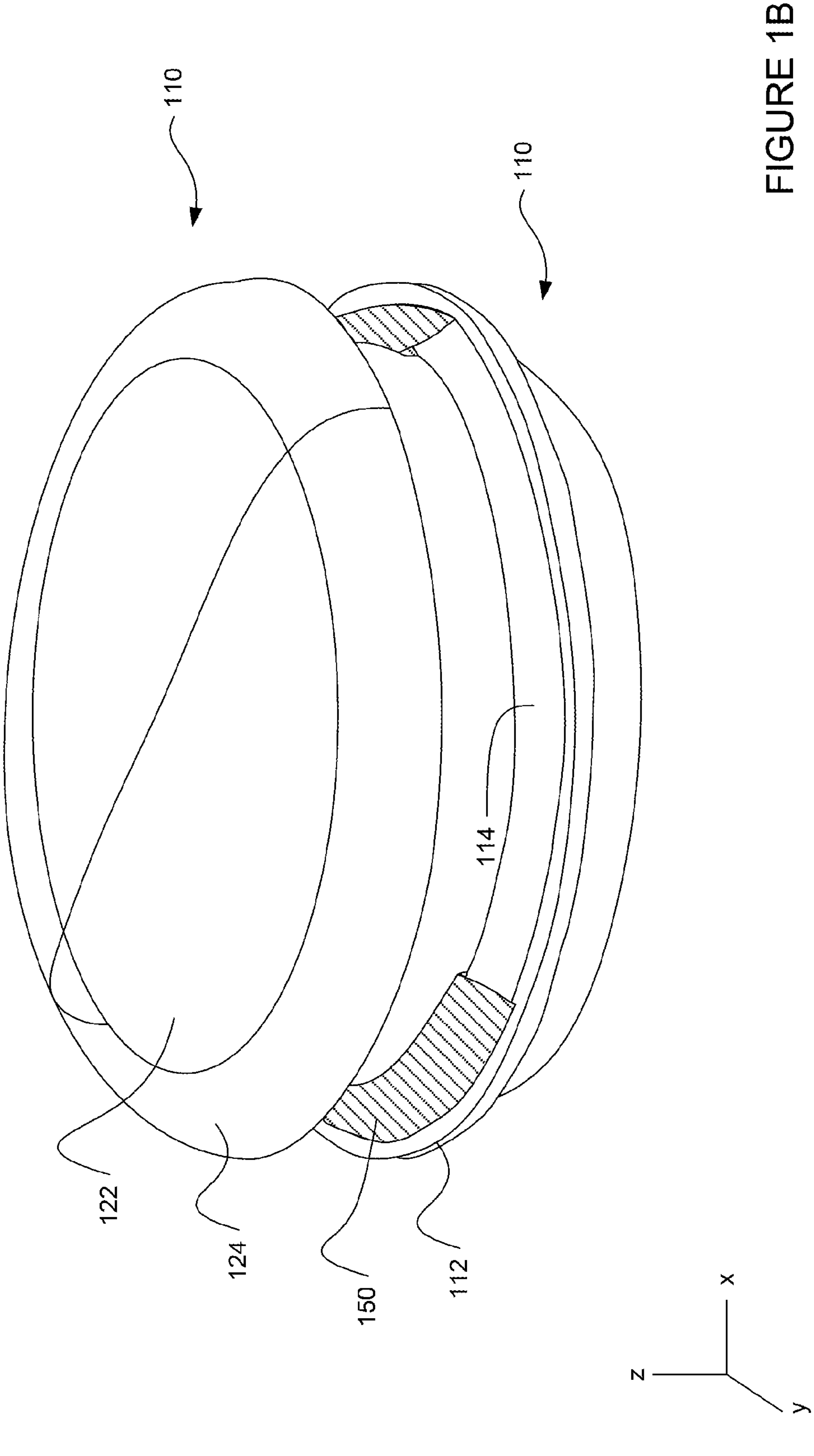

FIGS. 1A and 1B illustrate an example device 100 that includes one or more modular components that provide water resistance. As shown, the example device 100 is a wearable device, in particular a smartwatch. However, it should be understood that the one or more modular components may be implemented in any of a variety of devices with a housing and a display cover, including both wearable and non-wearable devices, such as pendants, head-mounted devices, smartphones, tablets, etc. FIG. 1A shows a top view of an exterior of the device 100, and FIG. 1B shows an exploded view exposing an interior of the device 100.

As shown in FIG. 1A, the device 100 has a housing 110 and a display cover 120 attached to or mounted on the housing 110. The housing 110 may be configured to provide support and protection to various electronic, optical, and/or mechanical components of the device 100. The housing 110 may be made out of a variety of materials, such as metal, alloy, plastic, glass, ceramics, or any combination of these or other materials. In instances where the housing 110 is at least partially made of a conductive material such as metal, the housing 110 may be configured to provide grounding for one or more components of the device 100. The housing 110 may be any shape, such as round, rectangular, square, oval, etc. A top surface of the housing 110 may be configured to be attached to the display cover 120, such as by having an opening with a similar shape as the display cover 120, and structures such as bezels, mounts, grooves, etc. Where the device 100 is a wearable device, a bottom surface of the housing 110 opposite the display cover 120 may be configured to be in contact with skin or clothing, such as by having a generally flat or smooth surface. The housing 110 may further include other features, such as a button, a crown, etc.

The display cover 120 may be configured to protect and enable viewing of and interactions with a display underneath the display cover 120. For example, the display may be a screen or a touch screen including various electronic, optical, and mechanical components. The display cover 120 may be made of any of a number of transparent materials. For example, the display cover 120 may be made of a dielectric material such as glass, polymers, sapphire, etc. The display cover 120 may be configured to have a similar or different shape as the surface of the housing 110 to which the display cover 120 is attached. In this example shown in FIG. 1A, the display cover 120 has the similar round shape as the top surface of the housing 110 to which it is attached.

The housing 110 may further be adapted to modularly attach to other components. For example as shown in FIG. 1A, where the device 100 is a smartwatch, housing 110 may be adapted to be attached to a watch band 140. The watch band 140 may be made of any appropriate material, including metal, ceramic, leather, polymers, fabric, or any combination of such materials. In instances where the watch band 140 is at least partially made of a conductive material such as metal, the watch band 140 may be configured to provide grounding for one or more components of the device 100.

Referring to FIG. 1B, the perspective view of the device 100 shows that the display cover 120 has a three-dimensional shape. For instance as shown, the display cover 120 may have a planar portion 122, and an edge 124 that curves around the planar portion 122. As such, the display cover 120 has a dome-like shape. Alternatively, the display cover 120 may have a two-dimensional shape, such as a planar glass without any curvature, or a substantially two-dimensional shape, such as a planar glass having multiple edges and only some of the edges have a curvature, etc. As another alternative, the display cover 120 may not have any planar portion at all, such as a glass that is semispherical or ellipsoidal in shape. In some instances, the display cover 120 may have one or more viewing regions through which a user may view and interact with a display underneath (such as the planar portion 122), and one or more peripheral regions for attaching to the housing 110 (such as the edge 124).

The exploded view of FIG. 1B also shows that one or more modular components may be disposed in the housing 110. For instance, the modular component 150 (shown as shaded) may be disposed along an edge 112 of the housing 110. As such, when the display cover 120 is positioned on the edge 112 of the housing 110, the modular component 150 is positioned along an inside surface of the display cover 120*a*. The modular component 150 may be attached to the housing 110 in any of a number of ways, for example, the modular component 150 may be attached to the housing 110 through an adhesive, such as glue, tape, resin, etc.

Further as shown in FIG. 1B, the modular component 150 may have an arcuate shape adapted to be attached to a portion of edge 112 of the housing 110. For example, the edge 112 may have a circumference or perimeter "L," and the modular component may have a length of "(" that is a fraction of L. As such, the edge 112 of the housing 110 is attached to the display glass 120 via the modular component 150 along some portion(s) of its circumference or perimeter, while along remaining portion(s) of its circumference or perimeter, the edge 112 may be directly connected to the display glass 120 via an adhesive. For example as shown, the remaining portion of the edge 112 may include a ridge 114, which can be directly attached to the display glass 120 via an adhesive. In some examples, the same liquid adhesive may be used for the entire perimeter of the edge 112 of the housing 110, both on the modular component 150 and the ridge 114, to ensure water-resistant seal to the display cover 120. Such a configuration may create space for positioning one or more components inside the housing 110 near the remaining portion of the edge 112, such as near ridge 114. Alternatively, the modular component 150 may have a ring shape (e.g., 360°) configured to be attached to the entire edge 112 of the housing 110. Such a configuration where the modular component 150 seals the entire edge 112 of the housing 110 may provide increased water resistance.

Although the housing 110 is shown in FIG. 1B to have a round shape and edge 112 is shown to have a circular shape, in other instances the housing 110 and edge 112 may have other shapes, such as elliptical, square, triangular, polygon, arbitrary shape, etc. In such instances, the modular component 150 may also be configured to have a shape that fits on a portion of the edge 112 or on the entire edge 112. For example, the modular component 150 may alternatively be three quarters of an ellipse, three sides of a square, etc.

Figure 2A:
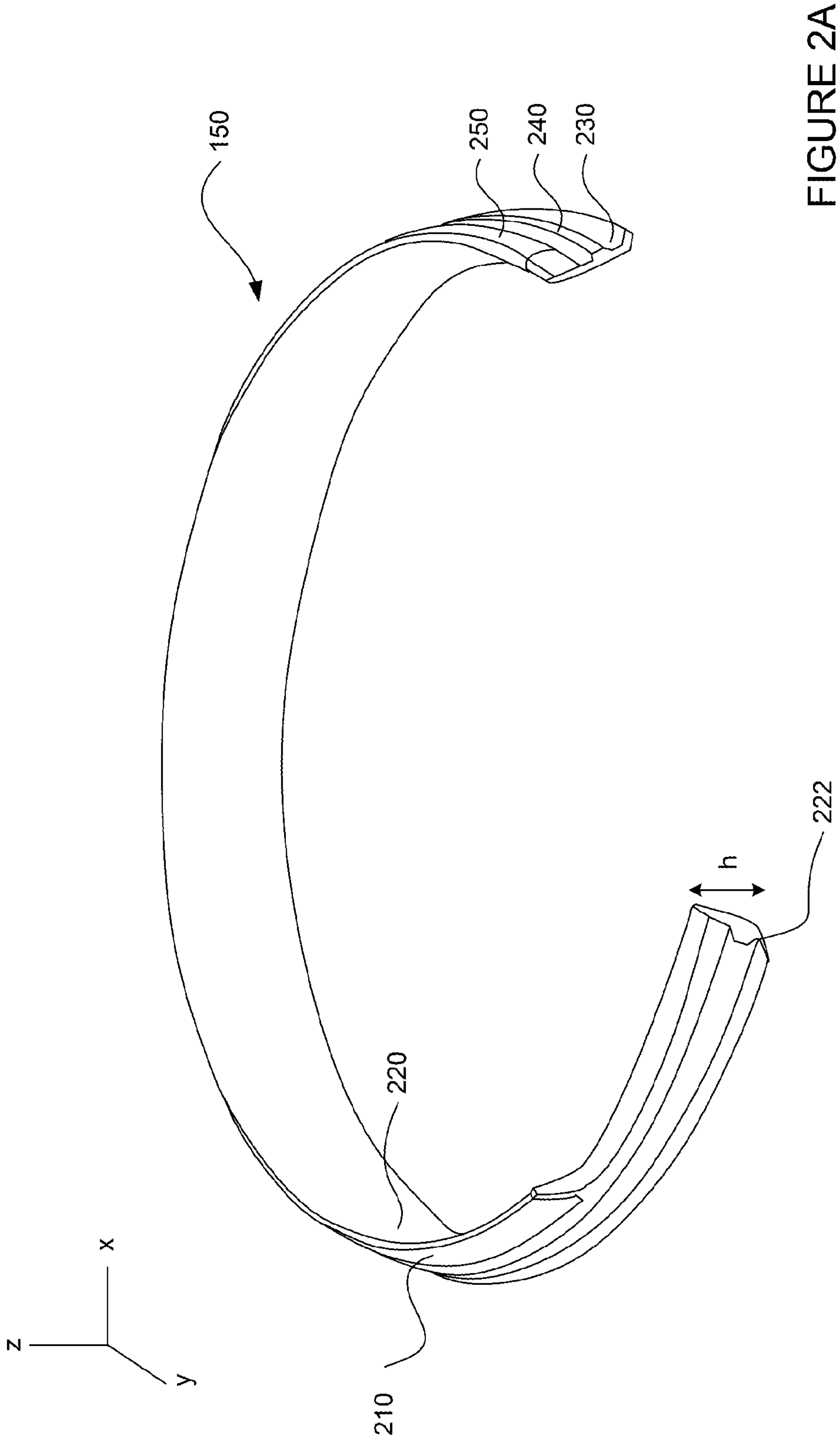
FIGS. 2A, 2B, and 2C show various views of an example modular component in accordance with aspects of the disclosure.
Figure 2B:
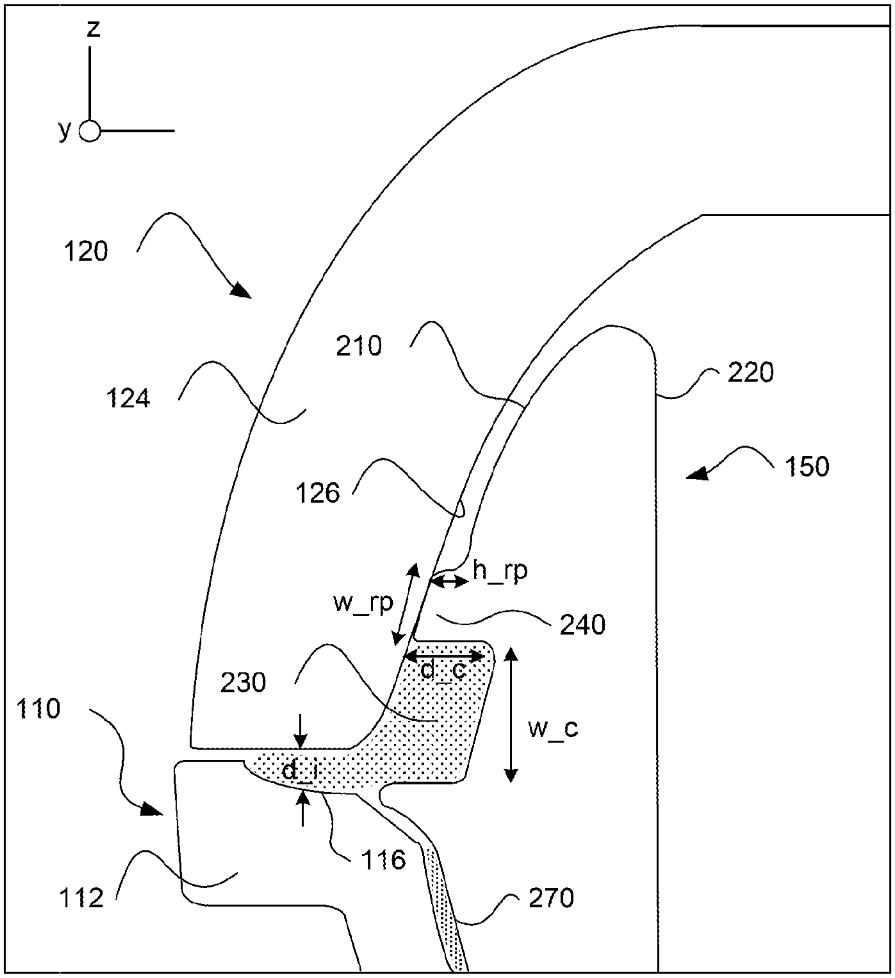
Figure 2C:
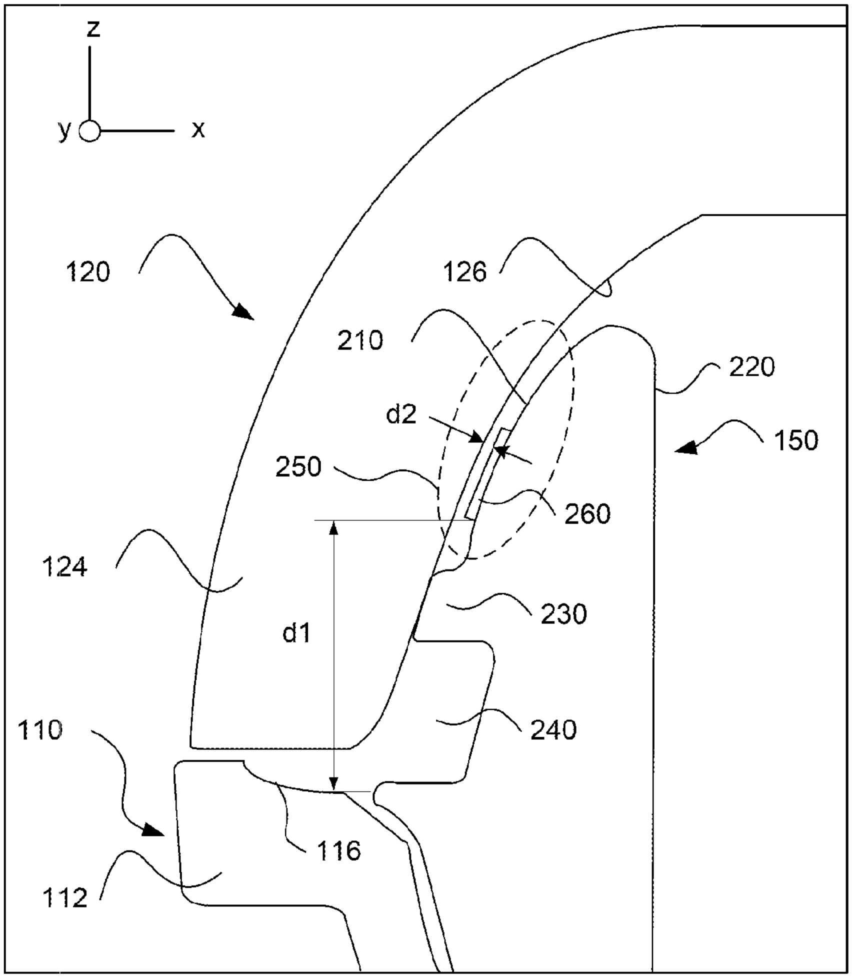

FIGS. 2A, 2B, and 2C illustrate an example configuration of the modular component 150. FIG. 2A shows a perspective view of the modular component 150. FIGS. 2B and 2C show cross-section views of the modular component 150 in relation to other components of the device 100.

Referring to FIG. 2A, the modular component 150 may include various structures to provide a water-resistant seal and antenna integration. For instance, the modular component 150 may have an outer surface 210 and an inner surface 220, where the outer surface 210 may be configured to be attached to an inside surface of the display cover 120. One or more surfaces of the modular component 150, such as the outer surface 210, the inner surface 220, and/or bottom surface 222 may be configured to be attached to the housing 110, such as to the edge 112 of the housing 110. The outer surface 210 may include structures, such as a channel 230 configured to provide space for holding adhesives and a radial protrusion 240 configured to prevent the adhesives from overflowing. The outer surface 210 of the modular component 150 may further provide one or more regions where antennas may be integrated, such as an upper region 250 of the outer surface 210. Alternatively or additionally, the inner surface 220 of the modular component 150 may also provide one or more regions where antennas may be integrated, such as an upper region of the inner surface 220 opposite region 250.

FIG. 2B further illustrates the modular component 150 in relation to other components of the device 100. As shown, when the display cover 120 is placed on the housing 110, the modular component 150 is disposed inside the housing 110 and the display cover 120. For instance as shown, a lower portion 270 on the outer surface 210 of the modular component 150 may be attached to the edge 112 through an adhesive (shown as shaded). Additionally or alternatively, other surfaces of the modular component 150, such as inner surface 220 or bottom surface 222, may also be attached to the housing 110. The adhesive may be any of a number of types, such as pressure sensitive adhesive (PSA), thermal bond film, heated activated film, UV glue, cyanoacrylate, polyurethane (PUR), hot-melt, one-part or two-part epoxy, etc.

Further as shown, channel 230 may be formed in the outer surface 210 of the modular component 150 for holding adhesives. The channel 230 extends along the modular component 150 such that when the display cover 120 is placed on the housing 110, the channel 230 is next to the display cover 120. This way, adhesives in the channel 230 may bond the display cover 230 to the modular component 150. Additionally, the channel 230 may also be positioned near the edge 112 of the housing 110. As such, adhesives in the channel 230 may provide additional bonding between the housing 110 and the modular component 150. The channel 230 may run along the entire length l of the modular component 150 as shown in FIG. 2A. Alternatively, the channel 230 may only run partially along the length l of the modular component 150, for example having a length that is a fraction of length l, or being a number of segments along length l.

Any of a number types of adhesives may be applied in the channel 230. For example, a liquid adhesive (shown as shaded) may be applied by inserting a needle in the channel 230 before the display cover 120 is positioned on the housing 110. Since liquid adhesives may flow and expand to fill spacing, liquid adhesives may in many instances provide better sealing and thus better water resistance than solid adhesives such as tapes. Liquid adhesives may be particularly advantageous where the display cover 120 has a three-dimensional shape as shown, since the liquid adhesive may expand to fill a curved space better than a flat tape. Examples of liquid adhesives include pressure sensitive adhesive (PSA), thermal bond film, heated activated film, UV glue, cyanoacrylate, polyurethane (PUR), hot-melt, one-part or two-part epoxy, etc. In some instances, the liquid adhesive may provide water resistance up to 50 meters (equivalent to 5 bars or 5 atms) or more.

However, because of this fluidity, liquid adhesives may leak or expand to unwanted areas, such as onto the viewing regions of the display cover 120 or electronic and/or mechanical components of the device 100, which may obstruct viewing or otherwise affect the functions of the device 100. In this regard, above the channel 230, radial protrusion 240 is configured to prevent the liquid adhesive from leaking or expanding onto the viewing regions of the display cover 120 and/or other electronic or mechanical components of the device 100. The radial protrusion 240 may run along the modular component 150 next to the channel 230. As such, the radial protrusion 240 may run along the entire length l of the modular component 150 as shown in FIG. 2A, or may only run partially along the length l of the modular component 150, for example having a length that is a fraction of length l, or being a number of segments along length l.

Below the channel 230, leaking or expansion of the liquid adhesive may be prevented by the outer surface 210 of the modular component 150 and the edge 112 of the housing 100. Further as shown in FIG. 2B, in some instances the edge 112 of the housing 110 may include an indent 116 to provide additional space for applying and holding any overflowing adhesives.

The radial protrusion 240 may also be configured to provide guidance for precise positioning of the display cover 120 on the housing 110. Referring back to FIG. 1B, while setting the display cover 120 on the edge 112 of the housing 110 may achieve an accurate position in the z-direction, doing so may result in an offset in the x-y directions between the display cover 120 and the housing 110, since the edge 112 of the housing 110 may not have the same diameter as the display cover 120. In this regard, by configuring the radial protrusion 240 with dimensions matching at least a portion of the inside surface 126 of the display cover 120, accurate positioning between the housing 110 and the display cover 120 in the x-y directions may be achieved when the inside surface 126 of the display cover 120 is in contact with the radial protrusion 240. For example, where the display cover 120 has a three dimensional shape, the radial protrusion 240 may be configured to have matching curvatures has the inside surface 126 of the display cover 120.

FIG. 2C illustrates antenna integration on the modular component 150. For instance as shown, the modular component 150 may include a region 250 on the outer surface 210 where one or more antennas 260 may be disposed. To provide insulation to the one or more antennas 260, the modular component 150 may be made of a non-conductive material, such as plastic, polymer, fiber, resin, etc.

Since antenna performance may be negatively affected by proximity to conductive elements, as shown in FIGS. 2A and 2C, the region 250 may be an area on the outer surface 210 above the radial protrusion 240. As such, a clearance distance "d1" is provided between the one or more antennas 260 and the housing 110. As shown, the indent 116 in the housing 110 may further increase the clearance distance d1. Further, by disposing the antennas 260 on the outer surface 210, clearance distances between the antennas 260 and other conductive elements inside the housing 110 may be increased. By positioning the antennas 260 in region 250, the radial protrusion 240 may prevent liquid adhesives from leaking or expanding onto the antennas 260.

Antenna performance may also be affected by proximity to dielectric materials. Thus as shown, the radial protrusion 240 provides a clearance distance "d2" between the one or more antennas 260 and the display cover 120. Antenna performance may be affected by the dielectric properties of the display cover 120, which may depend on dimensions of the display cover 120. For example, increasing thickness of the display cover 120 may increase dielectric loading effect on the antennas, which may cause degraded radiation efficiency and antenna frequency detuning. As another example, changing curvature of the display cover 120 may result in a change in distance between the antenna and the display cover 120 in some areas, which may also affect antenna frequency tuning and radiation performance. Thus, aspects of the display cover 120 and the clearance distance d2 may be selected based on the required antenna performance.

In addition, when the device 100 is a wearable device and worn with the housing 110 in proximity to skin and the display cover 120 at a greater distance from the skin, a distance between the antennas 260 and the skin is increased by positioning the antennas 260 on the modular component 150 as compared to on the housing 110. The clearance distance d1 therefore also represents increased distance between antennas 260 and the skin, which reduces body effects that may negatively impact antenna performance, such as detuning, attenuation, and shadowing. The increased distance may further reduce radiation on the skin from the antennas 260.

Clearance distances d1 and d2 may be adjusted in any of a number of ways. For example as shown in FIG. 2A, clearance distance d1 may be adjusted by increasing a height "h" of the modular component 150, which may be limited by a height of the display cover 120. Clearance distance d1 may also be adjusted by changing the relative positions and dimensions of the radial protrusion 240, the channel 230, and the antennas 260 along the height h of the modular component 150.

The antennas 260 may be disposed on the modular component 150 using any of a number of manufacturing techniques. As an example, the antennas 260 may be plated onto the modular component 150 via laser direct structuring ("LDS"). In this regard, the modular component 150 may be a resin material including an additive suitable for LDS. A laser may then transfer an antenna pattern to a surface of the modular component, such as top region 250 of the outer surface 210. The modular component 150 may then go through a metallization process, in which the antenna pattern is plated with one or more metallic materials, resulting in the antennas 260.

The channel 230 and the radial protrusion 240 may have any appropriate dimensions. Dimensions of the channel 230 may be chosen to accommodate a desired amount or volume of adhesive, and/or to allow tools such as a needle to be inserted into the channel 230 for injecting glue. By way of example, the channel 230 may have a depth "d_c" within a range of 0.5 mm-1 mm, and a width "w_c" within a range of 0.6 mm-1 mm. Dimensions of the radial protrusion 240 may be chosen to provide a snug fit with the inner surface 126 of the display cover 120, and/or to provide an appropriate clearance distance between the antennas 260 and the display cover 120. By way of example, the radial protrusion 240 may have a height "h_rp" within a range of 0.5 mm-1 mm, and a width "w_rp" within a range of 0.5 mm-1 mm. Although in the example shown in FIG. 2B, the height h_rp of the radial protrusion 240 is smaller than the depth d_c of the channel 230, in other examples the height h_p of the radial protrusion 240 may be the same or greater than the depth d_c of the channel. Where the edge 112 of the housing 110 includes an indent 116, the indent may have a depth "d_i" within a range of 0.1 mm-1 mm.

Although in the examples described above, the modular component 150 is shown to provide sealing for an electronic device with a display cover, the modular component 150 may also provide sealing for an electronic device without a display cover. For instance, for an electronic device without a display cover (for example an earbud), two halves or portions of a housing may be sealed by the modular component 150 in a similar way as described above, where channel 230 may provide space for applying liquid adhesives, radial protrusion 240 may prevent the liquid adhesives from overflowing, etc. For example, the outside surface 210 of the modular component 150 may have an area configured to be attached to an inside surface of the housing 110, and another area where one or more antennas 260 may be disposed. In the area configured to be attached to the inside surface of the housing 110, the channel 240 may extend along the outside surface 210 for application of adhesives, and radial protrusion 230 may be disposed along the outside surface 210 between the channel 240 and the one or more antennas 260 in order to prevent the adhesives from moving onto the one or more antennas 260.

Figure 3:
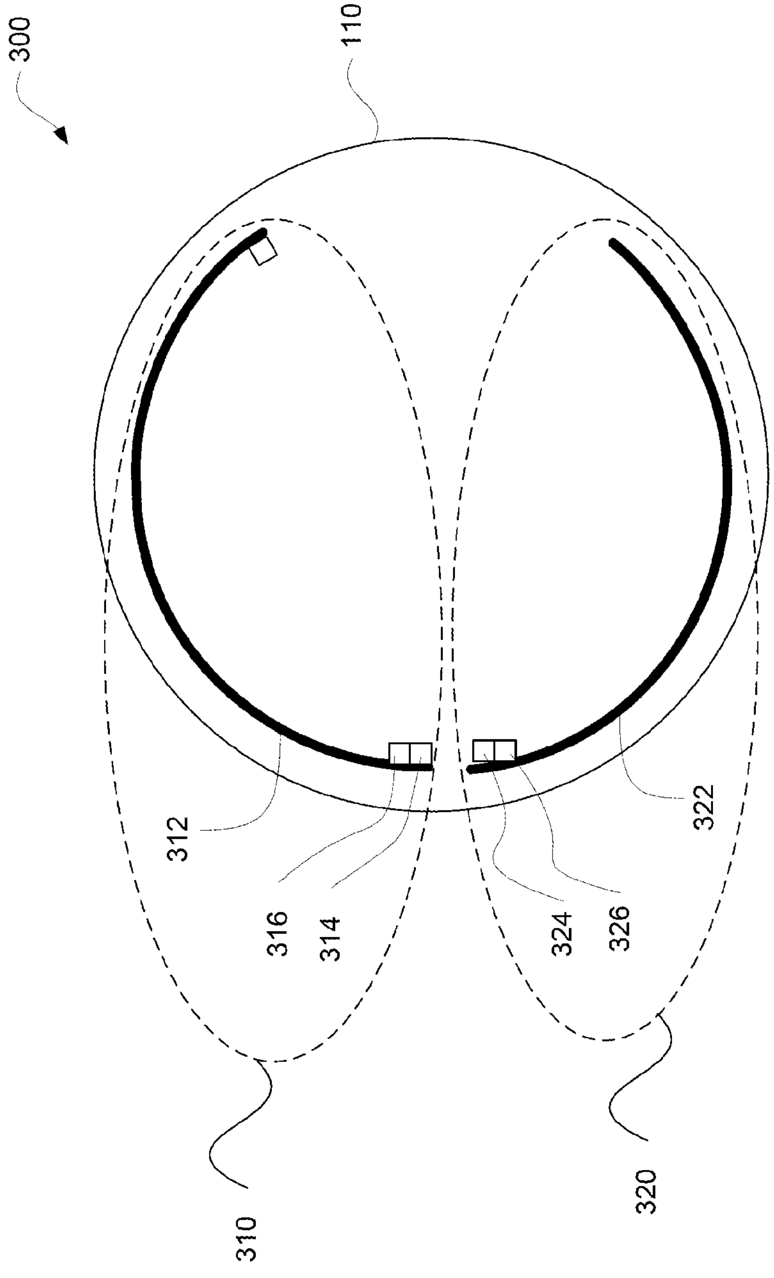
FIG. 3 illustrates an example antenna system in accordance with aspects of the disclosure.

FIG. 3 illustrates an example antenna system 300 that may be provided in device 100. FIG. 3 shows a top view of a horizontal cross section of the device 100, exposing one view of the antenna system 300. Referring to FIG. 3, the antenna system 300 may include a first antenna 310 and a second antenna 320. The first antenna 310 and the second antenna 320 may be configured to operate around the same or different sets of resonant frequencies. By way of example only, the first antenna 310 may be configured to operate in frequency ranges of GNSS frequency bands, which may include GPS frequency band centered around 1575.42 MHz, GLONASS frequency band between 1596-1607 MHz, BeiDou frequency band centered around 1561.098 MHz. The second antenna 320 may be configured to operate in frequency ranges between 2400 MHz and 2484 MHz for WiFi and Bluetooth signals. Although only two antennas are shown in the example antenna system 300, other antenna systems may include a smaller or greater number of antennas.

Referring to FIG. 3, the first antenna 310 and second antenna 320 may each be a semi-loop antenna. The first antenna 310 and the second antenna 320 may each include a radiating element 312, 322 having an arcuate shape (each shown as a bold line). Radiating elements are conductive elements configured to support currents or fields that contribute directly to the radiation patterns of the antenna. In this regard, the radiating elements 312, 322 may be made of any of a number of conductive materials, such as metals and alloys. The first antenna 310 and the second antenna 320 may each be positioned around a periphery of the housing 110, for example by plating the radiating elements 312, 322 onto the modular component 150 as described in the examples above. As another example, the first antenna 310 and/or the second antenna 320 may include multiple radiating elements coupled to each other, such as two arcuate-shaped radiating elements capacitively coupled to each other (e.g., positioned within close proximity but separated by air or a dielectric material).

The first antenna 310 and the second antenna 320 may each have a feed, such as feeds 314, 324 respectively. The feeds 314, 324 may each be positioned near an end of the respective radiating elements 312, 322. The feeds 314, 324 may be connected to transceivers and/or radio sources (not shown). For instance, the feeds 314, 324 may be configured to feed radio waves from a radio source, via a transmitter, to the rest of the antenna structure including the radiating elements 312, 322 respectively. The feeds 314, 324 may also be configured to collect incoming radio waves received at the radiating elements 312, 322 respectively, convert the incoming radio waves into to electric currents, and pass the electric currents to one or more receivers. In some examples, the first antenna 310 and/or the second antenna 320 may be capacitively fed by a feed structure positioned proximate to the feed 312, 324 respectively.

The first antenna 310 and the second antenna 320 may each have one or more ground connections, such as ground connections 316, 326 respectively. As further shown in FIG. 3, the ground connections 316, 326 may each be positioned near an end of the respective radiating elements 312, 322. The first antenna 310 and the second antenna 320 may further have a ground plane (not shown). A ground plane is a conducting surface that serves as a reflecting surface for radio waves received and/or transmitted by the radiating elements of an antenna. For example, the ground plane for the first antenna 310 and/or the second antenna 320 may be formed by one or more conductive components of the device 100, such as housing 110, watch band 140, etc.

Dimensions of the radiating elements 312, 322 may be selected for supporting operation in different frequency ranges. For example, dimensions of the radiating element 312, such as length, may be selected for operation in GNSS frequency bands. For instance, the length may be selected so that the radiating element 312 has resonant frequencies in the GNSS frequency bands. Likewise, dimensions of the radiating element 322, such as length, may be selected for operation in WiFi and Bluetooth frequencies. For instance, the length may be selected so that the radiating element 322 has resonant frequencies in the WiFi and Bluetooth frequency bands.

As alternative to semi-loop antennas, the first antenna 310 and/or the second antenna 320 may be any other types of antenna, such as a monopole antenna, a dipole antenna, a planar antenna, a slot antenna, a hybrid antenna, a loop antenna, an inverted-F antenna, etc. As such, the radiating elements 312, 322 may have any other appropriate shape. For example, where the housing 110 has a rectangular shape, and the modular component 150 spans three edges of the rectangle, the radiating elements 312, 322 may each have a planar shape along one or more edges of the modular component 150.

In instances where the antennas are plated on a surface of the modular component 150, some or all of the radiating elements, feeds, and/or ground connections may be plated, while other components, such as radio source, transceivers, transmitters, tuning circuitry, ground plane, etc. may be provided elsewhere in the housing 110, such as on a circuit board.

Figure 4:
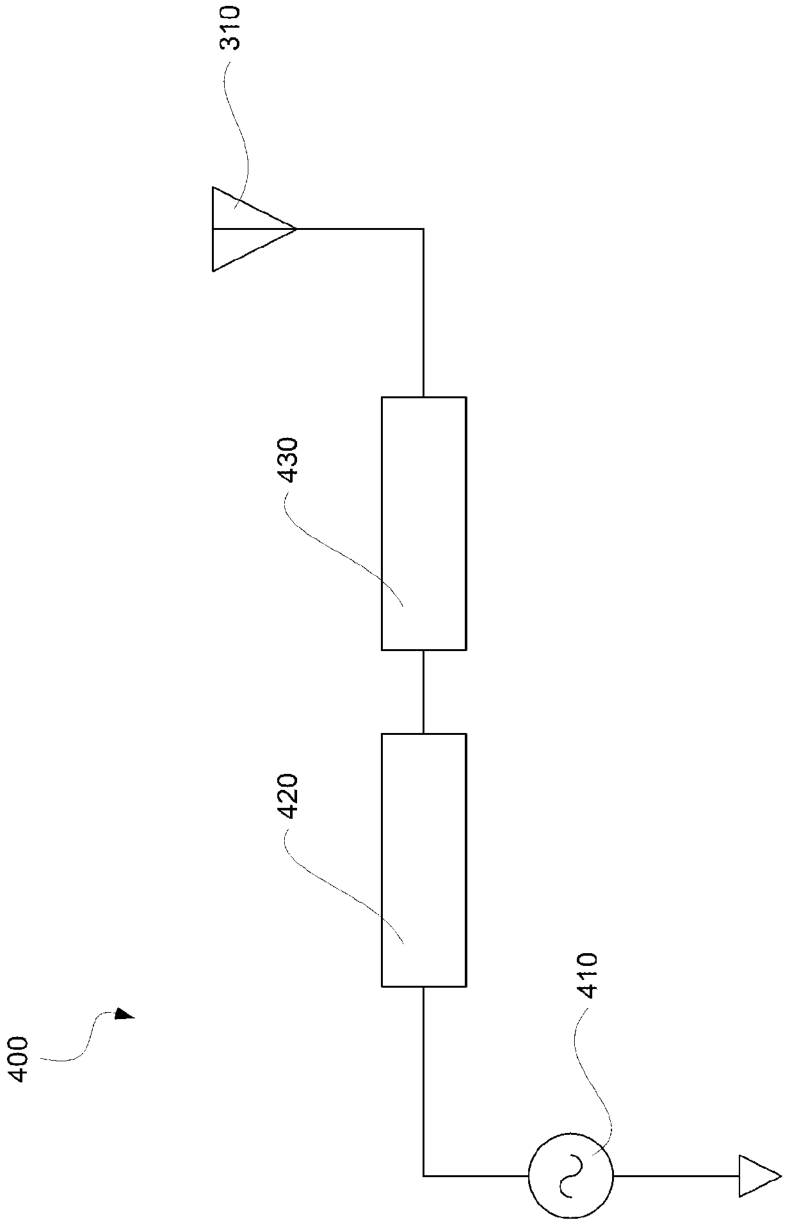
FIG. 4 is an example circuit diagram for an example antenna in accordance with aspects of the disclosure.

FIG. 4 shows an example circuit 400 for an antenna, such as the first antenna 310 or the second antenna 320. As shown, the first antenna 310 is connected to the radio source 410, for example at feed 314 (not shown). A matching network 420 may be provided between the radio source 410 and the feed 314. A matching network is an impedance transforming circuitry that ensures proper impedance matching by transforming either or both impedances of a radio source and a load. The matching network 420 may include components such as inductors and capacitors. For instance, the matching network 420 may increase or decrease impedance of the radio source 410 to match an impedance of the first antenna 310. Alternatively or additionally, the matching network 420 may increase or decrease impedance of the first antenna 310—the load—to match an impedance of the radio source Additionally or alternatively, one or more tuners 430 may be provided between the radio source 410 and the first antenna 310 and connected to the feed 314. For example, the one or more tuners 430 may include an impedance tuner and/or an aperture tuner. An aperture tuner is configured to change an aperture size of one or more radiating elements of an antenna, which affects a resonant frequency of the antenna. An impedance tuner is configured to change an impedance of one or more radiating elements of an antenna, which also affects a resonant frequency of the antenna.

In some instances, the one or more tuners 430 may include multiple tuners, such as a first tuner that selects a resonant frequency of the first antenna 310 within a communication band, and a second tuner that fine tunes within the selected communication band. Additionally, a pre-matching circuit (not shown) may be connected to the one or more tuners 430 to customize the one or more tuners 430 as needed. The one or more tuners 430 may improve frequency match, antenna efficiency, and reduce specific absorption rate.

Figure 6:
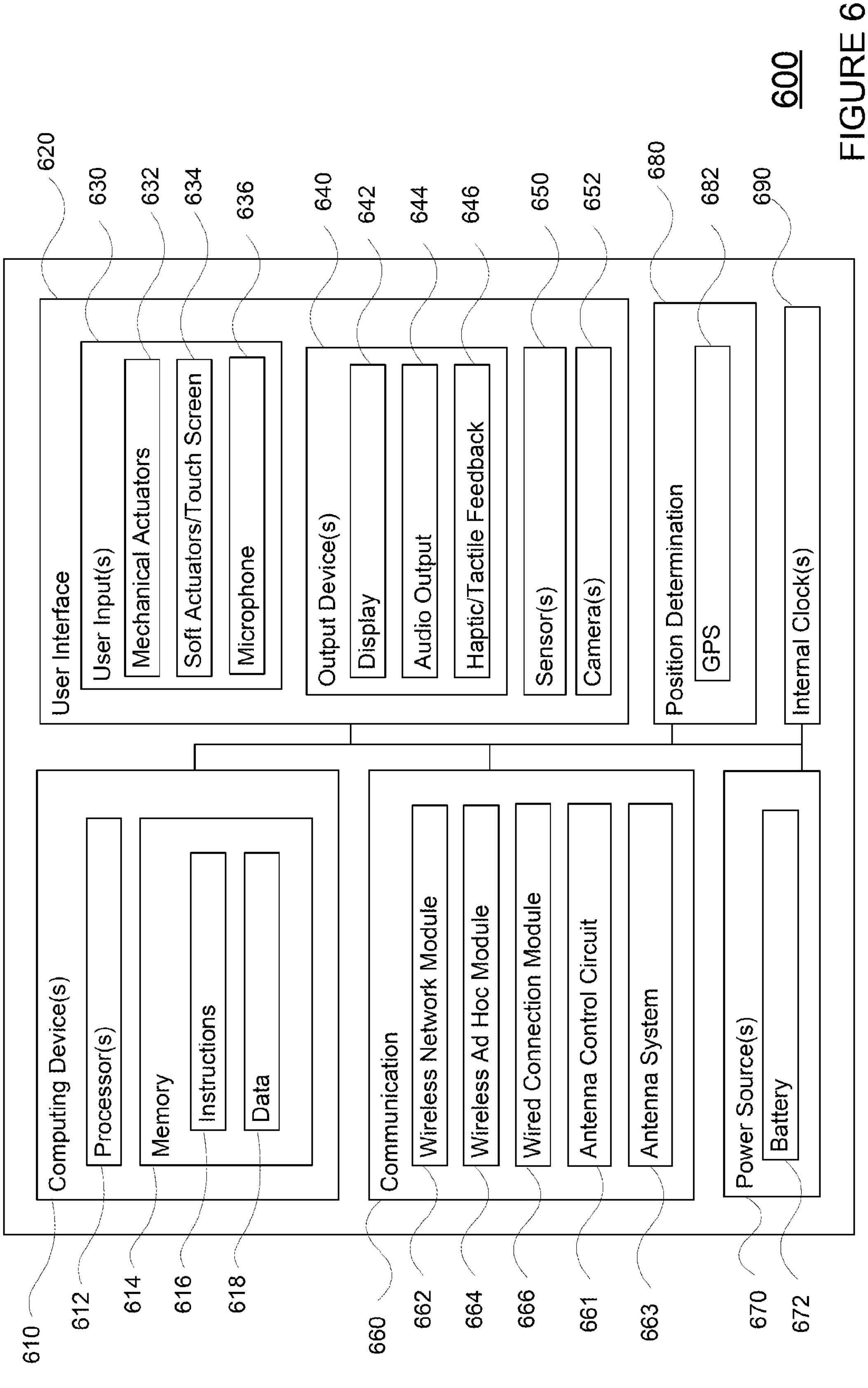
FIG. 6 is a block diagram illustrating an example system in accordance with aspects of the disclosure.

The one or more tuners 430 may be active tuners controlled by the antenna control circuit (not shown in FIG. 4, shown as 661 in FIG. 6). In this regard, the one or more tuners 430 may tune between different communication bands based on any of a number of network requirements, such as signal strength and user traffic. For example, the one or more tuners 430 may be configured such that, when signal strength drops below a low quality threshold for the GNSS band that the first antenna 310 is currently tuned to, the one or more tuners 440 may change an aperture size and/or an impedance of the radiating elements of the first antenna 310 to change its resonant frequency (changing tuning state), and to fine tune within that range.

Figure 5:
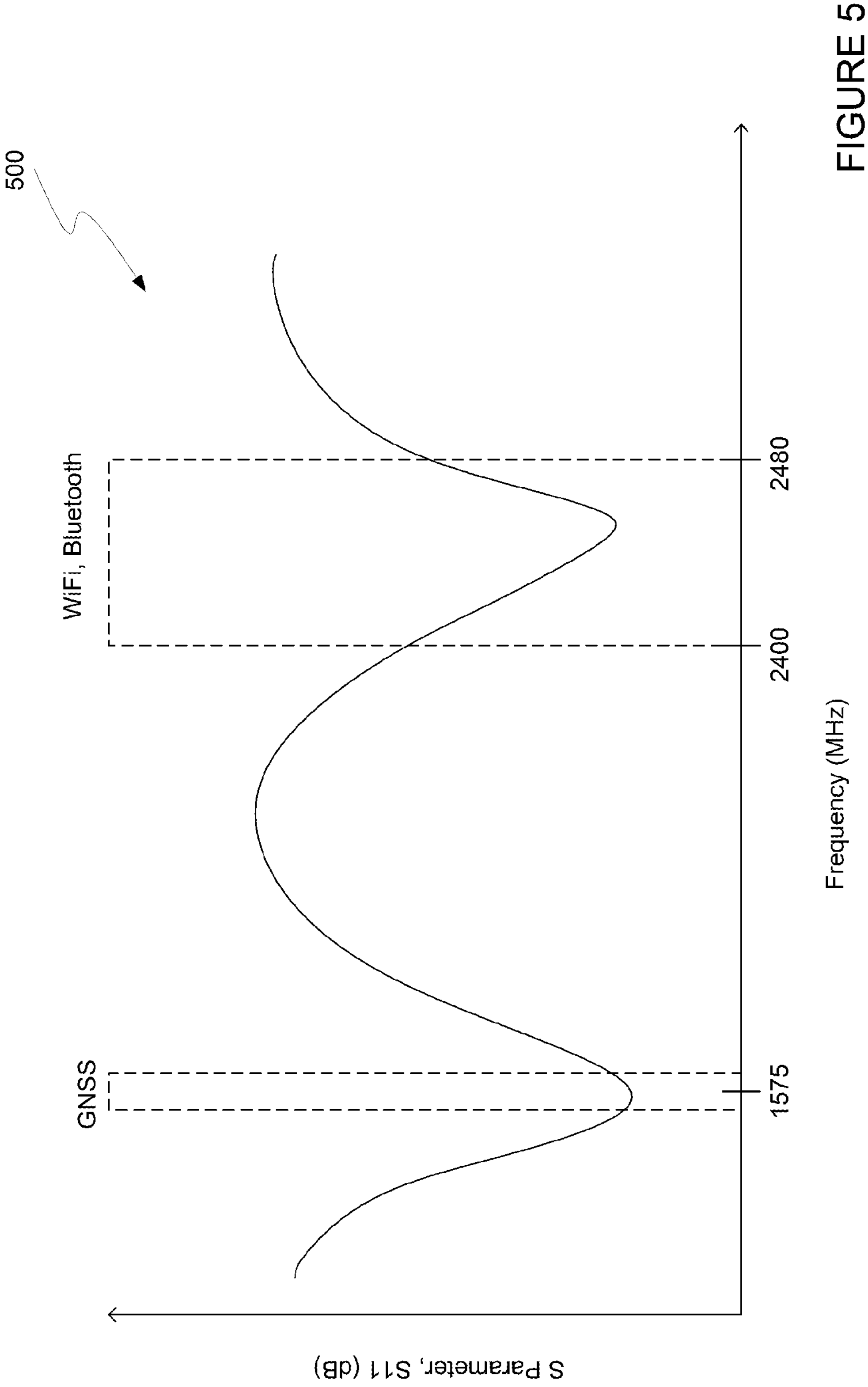
FIG. 5 is a graph showing example performances of an example antenna in accordance with aspects of the disclosure.

FIG. 5 shows an example performance graph of an antenna system, such as an antenna system including both the first antenna 310 and the second antenna 320. Graph 500 plots s parameter for GNSS, WiFi, and Bluetooth frequency ranges. The s parameter for an antenna describes the relationship between the input and reflected or pass-through power of the antenna. Here, the s parameter plotted is S11, which is the return loss of the antenna. The first antenna 310 is shown to be tuned to one or more GNASS frequency bands around 1575 MHz, which may include GPS frequency band centered around 1575.42 MHZ, GLONASS frequency band between 1596-1607 MHz, and BeiDou frequency band centered around 1561.098 MHz. Further, the second antenna 320 is shown to be tuned to WiFi and Bluetooth frequency bands between 2400 MHz and 2484 MHZ. As another example (not shown), the first antenna 310 and/or the second antenna 320 may additionally or alternatively be tuned to other frequency bands, such as LTE frequency bands. In this regard, the first antenna 310 and/or the second antenna 320 may be tuned by a tuning circuit such as circuit 400. Although the example graph 600 shows performance for an antenna system with two antennas, in other example antenna systems with a smaller or greater number of antennas, the antennas may be tuned to fewer or more frequency bands. For example, another antenna system may include a third antenna tuned to one or more LTE frequency bands.

FIG. 6 shows an example system 600 in accordance with aspects of the disclosure. The example system 600 may be included as part of the device 100. The system 600 has one or more computing devices, such as computing device(s) 610 containing one or more processor(s) 612, memory 614 and other components typically present in a personal computing device. The one or more processor(s) 612 may be processors such as commercially available CPUs. Alternatively, the one or more processors may be a dedicated device such as an ASIC, a single or multi-core controller, or other hardware-based processor.

The memory 614 stores information accessible by the one or more processor(s) 612, including instructions 616 and data 618 that may be executed or otherwise used by processor(s) 612. The memory 614 may be, e.g., a solid state memory or other type of non-transitory memory capable of storing information accessible by the processor(s), including write-capable and/or read-only memories.

The instructions 616 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in detail below.

User interface 620 may include user input(s) 630 and output device(s) 640. For instance, user input(s) 630 may include mechanical actuators 632, soft actuators 634, and microphone 636. The mechanical actuators 632 may include a crown, buttons, switches and other components. The soft actuators 634 may be incorporated into a touchscreen. For example, touch sensors for touchscreen may be incorporated in the display cover 120 or components of the display under the display cover 120.

The output device(s) 640 may include a user display 642, audio output 644, and haptic or tactile feedback 646. For example, the user display 642 may be a screen or a touch screen for displaying information to the user. The audio outputs 644 may include components such as speakers, transducers, etc. The haptic interface or other tactile feedback 646 may components such as haptic motors for providing non-visual and non-audible information to the wearer.

The user interface 620 may include additional components as well. By way of example, one or more sensor(s) 650 may be located on or within the housing 110. For example, touch sensors may be incorporated into the display cover 120 or the housing 110. The sensor(s) 650 may also include an accelerometer, e.g., a 3-axis accelerometer, a gyroscope, a magnetometer, a barometric pressure sensor, an ambient temperature sensor, etc. Additional or different sensors may also be employed. The user interface 620 may also include one or more camera(s) 652. For example the camera(s) 652 may be incorporated into the user display 642.

To obtain information from and send information to remote devices, the system 600 may include a communication subsystem 660 having a wireless network connection module 662, a wireless ad hoc connection module 664, and/or a wired connection module 666. The wireless network connection module 662 may be configured to support communication via cellular, LTE, 4G, WiFi, GPS, and other networked architectures. The wireless ad hoc connection module 664 may be configured to support Bluetooth®, Bluetooth LE, near field communications, and other wireless arrangements. And the wired connection module 666 may include a USB, micro USB, USB type C or other connector, for example to receive data and/or power from a laptop, tablet, smartphone or other device.

The communication subsystem 660 may include one or more antenna control circuits 661, which controls an antenna system 663. For example, the antenna system 663 may be the antenna system 300. The antenna control circuit 661 may control the feeding of the first antenna 310 and the second antenna 420 of the antenna system 300. The antenna control circuit 661 may further control tuning of the first antenna 310 and the second antenna 320, such as impedance tuners, aperture tuners, and or matching networks. While not shown, the communication subsystem 660 has a baseband section for processing data and a transceiver section for transmitting data to and receiving data from remote devices. The transceivers may operate at RF frequencies via one or more antennae, such as the first antenna 310 and the second antenna 320.

The system 600 includes one or more power source(s) 670 that provide power to the various components of the system. The power source(s) 670 may include a battery, such as battery 672, winding mechanism, solar cell or combination thereof. The computing devices may be operatively couples to the other subsystems and components via a wired bus or other link, including wireless links.

The system 600 also includes a position determination module 680, which may include a GPS chipset 682 or other positioning system components. Information from the sensor(s) 650 and/or from data received or determined from remote devices (e.g., wireless base stations or wireless access points), can be employed by the position determination module 680 to calculate or otherwise estimate the physical location of the system 600.

The system 600 includes one or more internal clock(s) 690 that provide timing information, which can be used for time measurement for apps and other programs run by the smartwatch, and basic operations by the computing device(s) 610, GPS 682, and communication subsystem 660.

The modular component as described herein provide increased water resistance for an electronic device, such as a water resistance of 50 meters (equivalent to 5 bars or 5 atmospheres). Structural features of the modular component allow liquid adhesives to be applied, which provide better adhesion with complex three dimensional structures. The structural features protect components in the electronic device by preventing overflow of the liquid adhesives, and also provide guidance for precise positioning of components relative to each other. Antenna integration in the modular component saves space in a small factor device and provides flexibility for both antenna design and device design. For example, adjustments can be made to the modular component to change characteristics of the antenna, instead of compromising dimensions and/or materials of the housing or the display cover. Features of the modular component further provide for reduced effects on the antenna from metallic and dielectric materials in the device, such as the housing and the display cover, greater isolation from the body effects of the user, and reduced exposure of a user's body to RF radiation.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An electronic device, comprising:

a housing;

a display cover;

a modular component configured to be attached to the housing and to provide a seal between the housing and the display cover, the modular component including:

a first surface configured to be attached to the display cover;

a channel extending along the first surface, the channel configured to hold a liquid adhesive that bonds with the display cover;

a radial protrusion disposed on the first surface, the radial protrusion configured to be in contact with the display cover when the display cover is attached to the housing and to prevent the liquid adhesive from moving out of the channel.

2. The electronic device of claim 1, wherein the modular component further includes one or more antennas.

3. The electronic device of claim 2, wherein the one or more antennas are disposed on the first surface, and the radial protrusion is disposed between the one or more antennas and the channel such that the radial protrusion prevents the liquid adhesive from moving to the one or more antennas.

4. The electronic device of claim 2, wherein the radial protrusion is configured to provide a predetermined clearance distance between the one or more antennas and the display cover.

5. The electronic device of claim 2, wherein the modular component is configured to provide a predetermined clearance distance between the one or more antennas and the housing.

6. The electronic device of claim 1, wherein the display cover has a three-dimensional shape with one or more curved portions, wherein the channel is positioned such that the liquid adhesive bonds with the one or more curved portions of the display cover, and wherein the radial protrusion is configured to be in contact with the one or more curved portions of the display cover.

7. The electronic device of claim 1, wherein the display cover has one or more viewing regions with a display underneath and one or more peripheral regions configured to be attached to the housing, wherein the channel is positioned so that the liquid adhesive bonds with the one or more peripheral regions, and wherein the radial protrusion is configured to be in contact with the one or more peripheral regions such that the radial protrusion prevents the liquid adhesive from moving to the one or more viewing regions.

8. The electronic device of claim 1, wherein the radial protrusion is configured to have dimensions matching at least a portion of an inside surface of the display cover.

9. The electronic device of claim 1, wherein the modular component has an arcuate shape configured to fit along a portion of an edge of the housing.

10. The electronic device of claim 1, wherein the modular component has a ring shape configured to fit along an entire edge of the housing.

11. The electronic device of claim 1, wherein an edge of the housing configured to be in contact with the display cover includes an indent providing additional space for holding the liquid adhesive.

12. The electronic device of claim 1, wherein the housing is made of a conductive material, and the display cover is made of a dielectric material.

13. A modular component for sealing a display cover to a housing of an electronic device, the modular component configured to be attached to the housing, the modular component comprising:

a first surface configured to be attached to the display cover;

a channel extending along the first surface, the channel configured to hold a liquid adhesive that bonds with the display cover;

a radial protrusion disposed on the first surface, the radial protrusion configured to be in contact with the display cover when the display cover is attached to the housing and to prevent the liquid adhesive from moving out of the channel.

14. The modular component of claim 13, further comprising:

one or more antennas.

15. The modular component of claim 14, wherein the one or more antennas is disposed on the first surface, and the radial protrusion is disposed between the one or more antennas and the channel.

16. The modular component of claim 13, wherein the modular component has an arcuate shape configured to fit along a portion of an edge of the housing.

17. The electronic device of claim 13, wherein the modular component has a ring shape configured to fit along an entire edge of the housing.

18. An antenna carrier for an electronic device, the antenna carrier comprising:

a first surface, the first surface having a first area configured to be attached to an inside surface of a housing of the electronic device;

a channel extending along the first surface in the first area, the channel configured to hold a liquid adhesive that bonds with the inside surface of the housing;

one or more antennas disposed in a second area on the first surface;

a radial protrusion disposed on the first surface in the first area between the channel and the one or more antennas, the radial protrusion configured to be in contact with the inside surface of the housing to prevent the liquid adhesive from moving out of the channel to the one or more antennas.

19. The antenna carrier of claim 18, wherein the one or more antennas are disposed on the first surface by laser direct structuring (LDS).

20. The antenna carrier of claim 18, wherein the one or more antennas includes a plurality of antennas configured to operate in different frequency ranges.

* * * * *